US012749935B2

(12) United States Patent
Yao et al.

(10) Patent No.: US 12,749,935 B2
(45) Date of Patent: Sep. 29, 2026

(54) AXIAL FLUX ELECTRIC MOTOR WITH ROTOR COOLING

(71) Applicant: GM GLOBAL TECHNOLOGY OPERATIONS LLC, Detroit, MI (US)

(72) Inventors: Jian Yao, Shanghai (CN); Chengwu Duan, Shanghai (CN); Vincent Fedida, Shanghai (CN); SeungHwan Keum, Northville, MI (US); Alan G. Holmes, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 261 days.

(21) Appl. No.: 18/609,135

(22) Filed: Mar. 19, 2024

(65) Prior Publication Data

US 2025/0088054 A1 Mar. 13, 2025

(30) Foreign Application Priority Data

Sep. 8, 2023 (CN) ......................... 202311161314.5

(51) Int. Cl.

| | |
|---|---|
| ***H02K 1/32*** | (2006.01) |
| ***H02K 1/24*** | (2006.01) |
| ***H02K 1/2795*** | (2022.01) |
| ***H02K 5/20*** | (2006.01) |
| ***H02K 11/25*** | (2016.01) |
| *H02K 16/02* | (2006.01) |

(52) U.S. Cl.

CPC ................. *H02K 1/32* (2013.01); *H02K 1/24* (2013.01); *H02K 1/2795* (2022.01); *H02K 5/20* (2013.01); *H02K 11/25* (2016.01); *H02K 16/02* (2013.01)

(58) Field of Classification Search

CPC .......... H02K 1/32; H02K 1/24; H02K 1/2795; H02K 5/20; H02K 11/25; H02K 16/02; H02K 9/06; H02K 9/19; H02K 21/24; H02K 1/2798

See application file for complete search history.

(56) References Cited

U.S. PATENT DOCUMENTS

2006/0284507 A1* 12/2006 Murakami ........... H02K 1/2798 310/156.55

2010/0289350 A1* 11/2010 Watanabe .............. H02K 3/522 310/63

(Continued)

*Primary Examiner* — Thomas Truong

(74) *Attorney, Agent, or Firm* — Quinn IP Law

(57) ABSTRACT

A cooled axial flux electric motor includes a rotationally-fixed stator defining a rotational axis and having a plurality of conductive stator magnetic poles arranged radially about the axis. The motor also includes a rotor spaced axially from one side from the stator and rotatably mounted coaxially with the rotational axis and defined by inside and outside diameters. The rotor has a first exterior surface facing the stator and a second exterior surface arranged opposite the first exterior surface. A ferromagnetic rotor core defines the rotor second exterior surface. The rotor also includes alternating south and north pole permanent magnets (PMs) arranged on the rotor core symmetrically around the axis and facing the stator. The rotor additionally includes channels extending radially outwardly across the rotor and configured to direct a coolant, via centrifugal force, from the inside diameter toward the outside diameter as the rotor rotates about the axis.

20 Claims, 5 Drawing Sheets

(56) References Cited

U.S. PATENT DOCUMENTS

| | | | | |
|---|---|---|---|---|
| 2015/0263590 | A1* | 9/2015 | Wetzel | H02K 9/04 310/61 |
| 2016/0344249 | A1* | 11/2016 | Enjoji | H02K 1/2798 |
| 2021/0288554 | A1* | 9/2021 | Yao | H02K 5/203 |

* cited by examiner

AXIAL FLUX ELECTRIC MOTOR WITH ROTOR COOLING

CLAIM OF PRIORITY AND CROSS-REFERENCE TO RELATED APPLICATION

This application claims the benefit of Chinese Application Serial No. CN202311161314.5 filed Sep. 8, 2023, the content of which is incorporated by reference in its entirety.

INTRODUCTION

The disclosure relates to an axial flux electric motor with rotor cooling.

An electric motor is a machine that converts electric energy into mechanical energy. Electric motors may be configured as an alternating current (AC) or a direct current (DC) type. An electric motor's operation is based on an electromagnetic interaction between permanent magnets and the magnetic field created by the machine's selectively energized coils. Electric motors are classified into two categories based on the direction of the magnetic field-axial flux motors and radial flux motors.

As a byproduct of generated torque, electric motors produce thermal energy which may adversely affect motor performance and reliability. Cooling of an electric motor may therefore remove thermal stress seen by motor poles or windings and provide longer motor life under or close to peak load. Additionally, electric motor cooling may generally quiet motor operation and enhance motor operation at higher speeds, as well as facilitate reduced motor inertia and packaging.

SUMMARY

A cooled axial flux electric motor includes a rotationally-fixed stator defining a rotational axis and having a plurality of conductive stator magnetic poles arranged radially about the rotational axis. The motor also includes a rotor spaced axially from one side from the stator and rotatably mounted coaxially with the rotational axis and defined by an inside diameter and an outside diameter. The rotor has a first exterior surface facing the stator and a second exterior surface arranged opposite the rotor first exterior surface and ferromagnetic rotor core defining the rotor second exterior surface. The rotor also includes a plurality of alternating south and north pole permanent magnets (PMs) arranged on the ferromagnetic rotor core symmetrically around the rotational axis and facing the stator. The rotor additionally includes a plurality of channels extending radially outwardly across the rotor. The channels are configured to direct a coolant, via centrifugal force, from the inside diameter toward the outside diameter as the rotor rotates about the rotational axis.

At least one of the plurality of channels may extend on the rotor first exterior surface across each of the PMs.

The ferromagnetic rotor core may include a plurality of core saliencies extending to the rotor first exterior surface. Each pair of alternating south and north pole PMs may include one of the core saliencies arranged therebetween. At least one of the plurality of channels may extend on the rotor first exterior surface between one of the PMs and one of the saliencies.

At least one of the plurality of channels may extend on the rotor's second exterior surface.

The plurality of channels may define a radially disposed channel pattern. The channel pattern may be one of a straight, inclined, and spiral relative to the rotational axis.

The cooled axial flux electric motor may further include a plurality of projections arranged on the outside diameter between the first and second rotor exterior surfaces.

Each of the projections may have a curved fan blade shape configured to shed the coolant from the outside diameter of the rotor.

The cooled axial flux electric motor may further include a rotor shaft fixed to the rotor and mounted rotationally inside the stator coaxially with the rotational axis. The rotor shaft may define a fluid passage configured to supply the coolant to the plurality of channels.

The cooled axial flux electric motor may further include a housing defining a fluid sump configured to collect the coolant after the coolant has passed through the plurality of channels and return the coolant to the fluid sump via gravity.

The fluid sump and the fluid passage in the rotor shaft may be in fluid communication with a fluid pump configured to supply the coolant from the fluid sump to the fluid passage in the rotor shaft.

A method of cooling an axial flux electric motor as described above is also disclosed. The method may be performed according to an algorithm programmed into an electronic controller.

The above features and advantages, and other features and advantages of the present disclosure, will be readily apparent from the following detailed description of the embodiment (s) and best mode(s) for carrying out the described disclosure when taken in connection with the accompanying drawings and appended claims.

DETAILED DESCRIPTION

Figure 1:
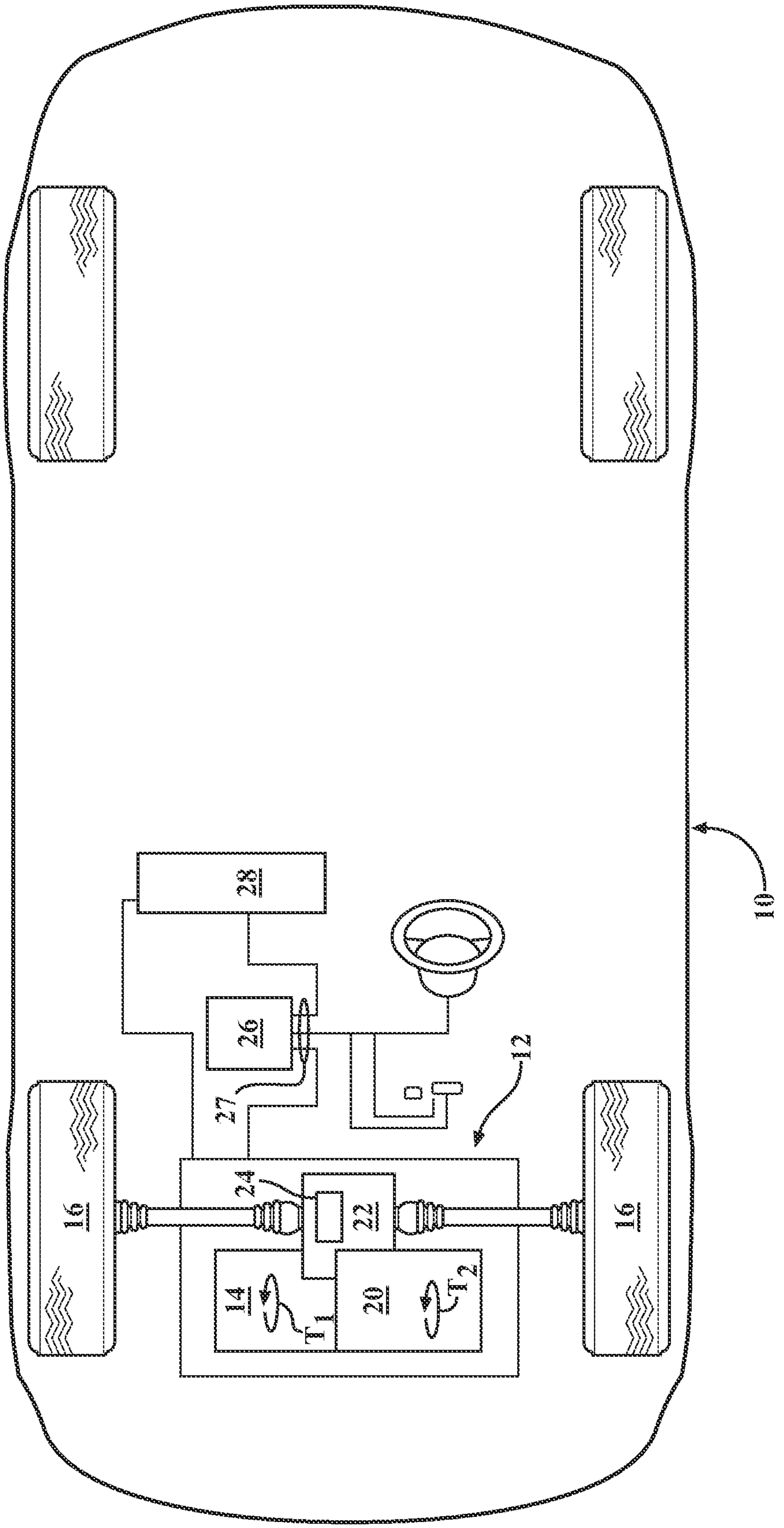
FIG. 1 is a schematic illustration of a motor vehicle having a powertrain employing an axial flux electric motor-generator for propulsion.

Embodiments of the present disclosure as described herein are intended to serve as examples. Other embodiments may take various and alternative forms. Additionally, the drawings are generally schematic and not necessarily to scale. Some features may be exaggerated or minimized to show details of particular components. Therefore, specific structural and functional details disclosed herein are not to be interpreted as limiting, but merely as a representative basis for teaching one skilled in the art to variously employ the present disclosure.

Certain terminology may be used in the following description for the purpose of reference only, and thus are not intended to be limiting. For example, terms such as "above" and "below" refer to directions in the drawings to which reference is made. Terms such as "front", "back", "fore", "aft", "left", "right", "rear", "side", "upward", "downward", "top", and "bottom", etc., describe the orientation and/or location of portions of the components or elements within a consistent but arbitrary frame of reference, which is made clear by reference to the text and the associated drawings describing the components or elements under discussion.

Furthermore, terms such as "first", "second", "third", and so on may be used to describe separate components. Such terminology may include the words specifically mentioned above, derivatives thereof, and words of similar import, and are used descriptively for the figures, and do not represent limitations on the scope of the disclosure, as defined by the appended claims. Moreover, the teachings may be described herein in terms of functional and/or logical block components and/or various processing steps. It should be realized that such block components may include a number of hardware, software, and/or firmware components configured to perform the specified functions.

Referring to FIG. 1, a motor vehicle 10 having a powertrain 12 is depicted. The vehicle 10 may include, but not be limited to, a commercial vehicle, industrial vehicle, passenger vehicle, aircraft, watercraft, train or the like. It is also contemplated that the vehicle 10 may be a mobile platform, such as an airplane, all-terrain vehicle (ATV), boat, personal movement apparatus, robot and the like to accomplish the purposes of this disclosure. The powertrain 12 includes a first power-source 14 depicted as an electric motor-generator and configured to generate a first power-source torque $T_1$ (shown in FIG. 1) for propulsion of the vehicle 10 via driven wheels 16 relative to a road surface. The motor-generator 14 may be configured as an axial flux electric motor where the gap between the machine's rotor and stator is arranged radially and perpendicular to the motor's axis of rotation.

As shown in FIG. 1, the powertrain 12 may also include a second power-source 20, such as an internal combustion engine configured to generate a second power-source torque $T_2$. The power-sources 14 and 20 may act in concert to power the vehicle 10 and be operatively connected to a transmission assembly 22. The transmission assembly 22 may be configured to transmit first and/or second power-source torques $T_1$, $T_2$ to a final drive unit 24, which in turn may be connected to the driven wheels 16. The first power-source 14, which for the remainder of the present disclosure will be referred to as a motor-generator, may, for example, be mounted to the second power-source 20, mounted to (or incorporated into) the transmission assembly 22, mounted to the final drive unit 24, or be a stand-alone assembly mounted to the structure of the vehicle 10. As shown, the vehicle 10 additionally includes a programmable electronic controller 26 configured to communicate via a high-voltage BUS 27 and control the powertrain 12 to generate a predetermined amount of power-source torque (sum of $T_1$ and $T_2$), and various other vehicle systems. The vehicle 10 additionally includes an energy storage system 28, such as one or more batteries, configured to generate and store electrical energy for powering the power-sources 14 and 20.

Figure 2:
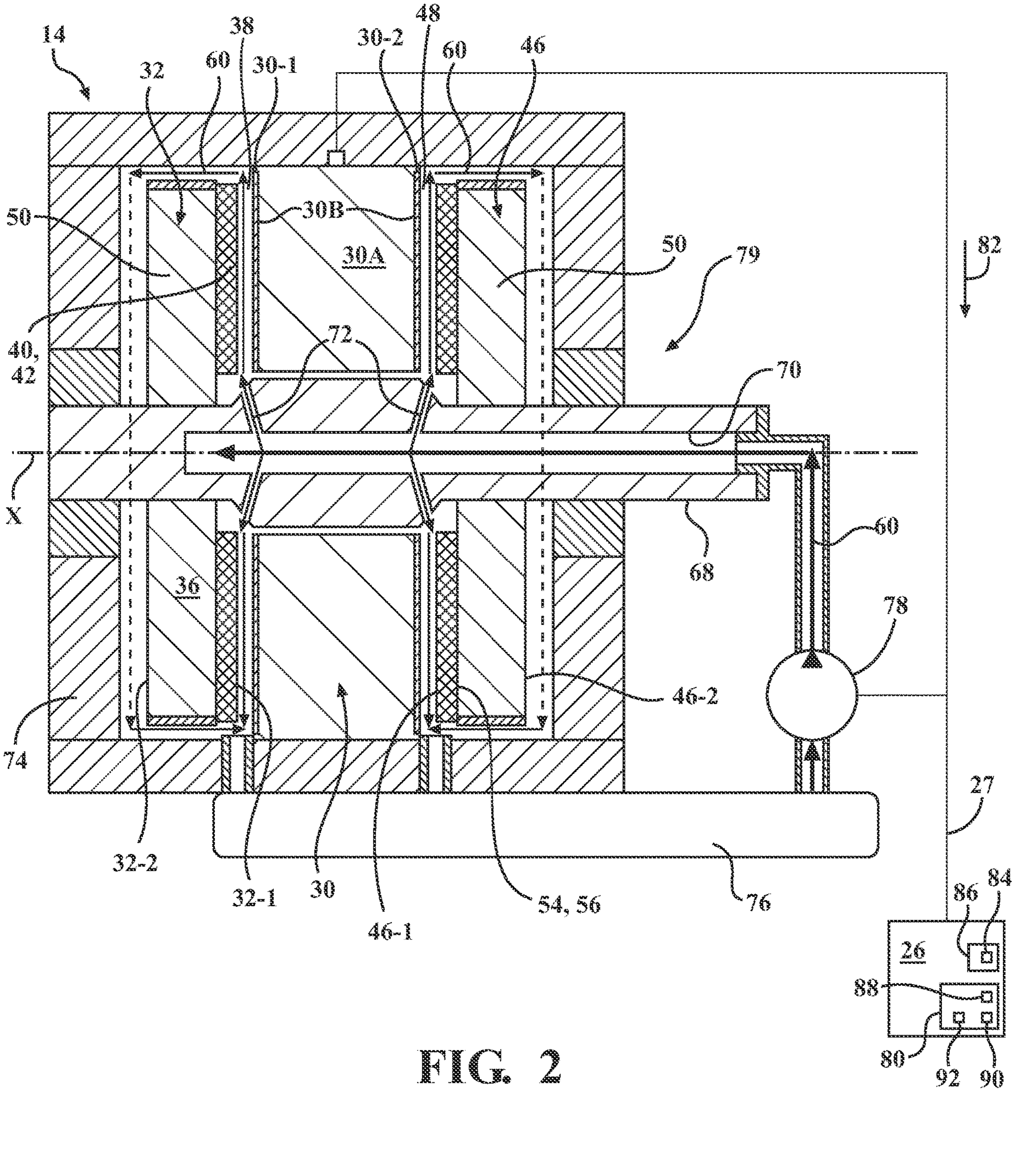
FIG. 2 is a schematic close-up cross-sectional side view of the axial flux motor-generator shown in FIG. 1, depicting a stator and two axially spaced rotors, according to the disclosure.

FIG. 2 illustrates a synchronous reluctance motor-generator 14. As shown, the motor-generator 14 includes a rotationally fixed stator 30. The stator 30 defines a rotational axis X and includes a stator core 30A and a plurality of magnetic poles 30B arranged radially about the rotational axis. The stator 30 has two opposing sides—a first side 30-1 and a second side 30-2. The motor-generator 14 also includes a first rotor 32 spaced axially from the first side 30-1 of the stator 30 creating an airgap 34 therebetween. The first rotor 32 is rotatably mounted coaxially with the rotational axis X and has a first rotor exterior surface 32-1 facing the stator 30. The first rotor 32 includes a first ferromagnetic rotor core 36. The first rotor core 36 may be constructed from a relatively soft magnetic material, such as laminated silicon steel, which has a plurality of first core protrusions or saliencies 38 (for example, shown in FIGS. 3 and 4) acting as magnetic poles via magnetic reluctance.

Figure 3:
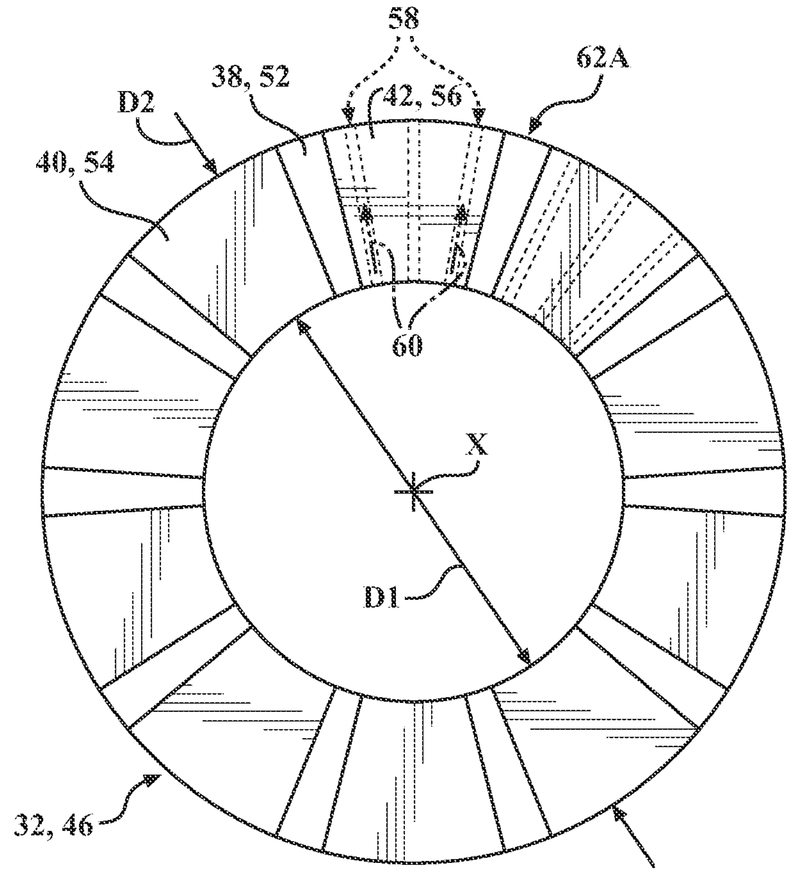
FIG. 3 is a schematic perspective view of one of the rotors shown in FIG. 2, illustrating an embodiment of plurality of coolant channels extending radially outwardly across the rotor, according to the disclosure.
Figure 4:
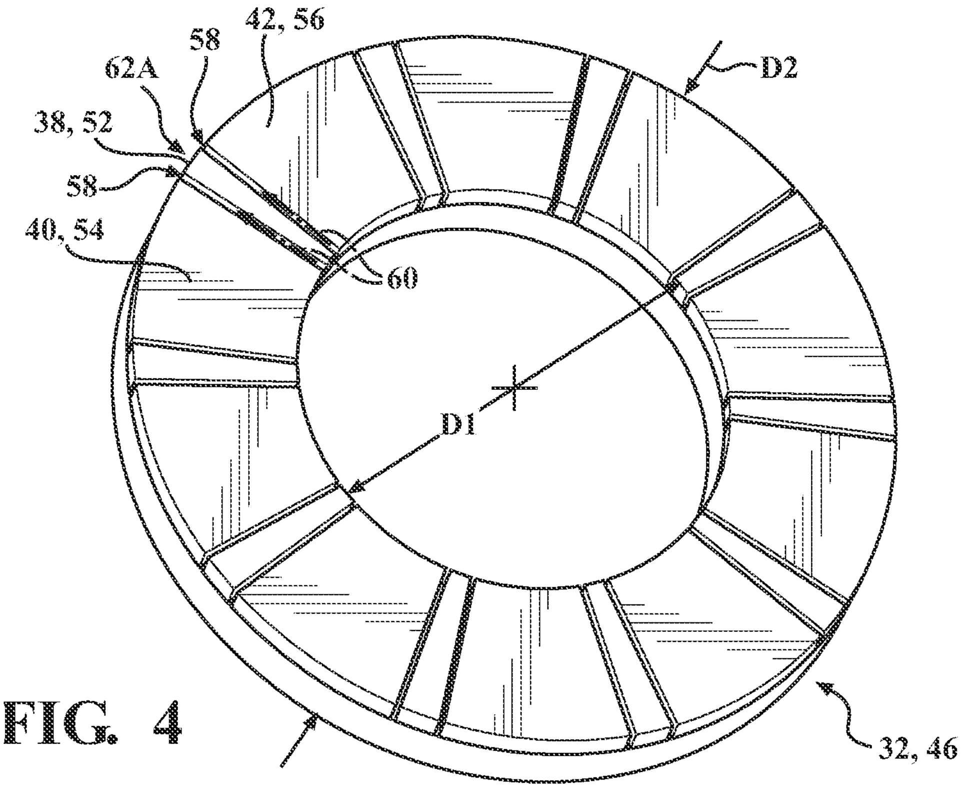
FIG. 4 is a schematic perspective view of one of the rotors shown in FIG. 2, illustrating another embodiment of plurality of coolant channels extending radially outwardly across the rotor, according to the disclosure.

As shown in FIGS. 3 and 4, the first core saliencies 38 extend to the first rotor exterior surface 32-1. During operation of the motor-generator 14, non-permanent magnetic poles are successively induced on the motor's saliency magnetic poles 38 to generate motor torque. As shown, the first rotor 32 also includes a plurality of alternating south pole permanent magnets (PMs) 40 and north pole PMs 42. The south and north pole PMs 40, 42 are arranged on the first ferromagnetic rotor core 36 (on the rotor first exterior surface 32-1) symmetrically around the rotational axis X and facing the stator 30. Each pair of alternating south and north pole PMs 40, 42 includes one of the first core saliencies 38 arranged or sandwiched therebetween.

With continued reference to FIG. 2, the motor-generator 14 may also include a second rotor 46 spaced axially from the second side 30-2 of the stator 30 creating an airgap 48 therebetween. The second rotor 46 is rotatably mounted coaxially with the rotational axis X and has a second rotor exterior surface 46-1 facing the stator 30. The second rotor 46 includes a second ferromagnetic rotor core 50 constructed generally like the first rotor core 36 and having a plurality of second core saliencies 52. The second core saliencies 52 extend to the second rotor exterior surface 46-1 and act as magnetic poles through magnetic reluctance. The second rotor 46 also includes a second plurality of alternating south and north pole PMs 54, 56 arranged on the second ferromagnetic rotor core 50 substantially symmetrically around the rotational axis X and facing the stator 30. As shown, and analogous to the first rotor 32, each pair of alternating south and north pole PMs 54, 56 of the second rotor 46 includes one of the second core saliencies 52 arranged therebetween. Accordingly, the specific motor-generator 14 is a surface-mounted permanent-magnet or synchronous machine. Although a synchronous machine embodiment of the motor-generator 14 is specifically shown, nothing precludes the motor-generator 14 from being configured as an asynchronous or induction motor, as understood by those skilled in the art.

Figure 5:
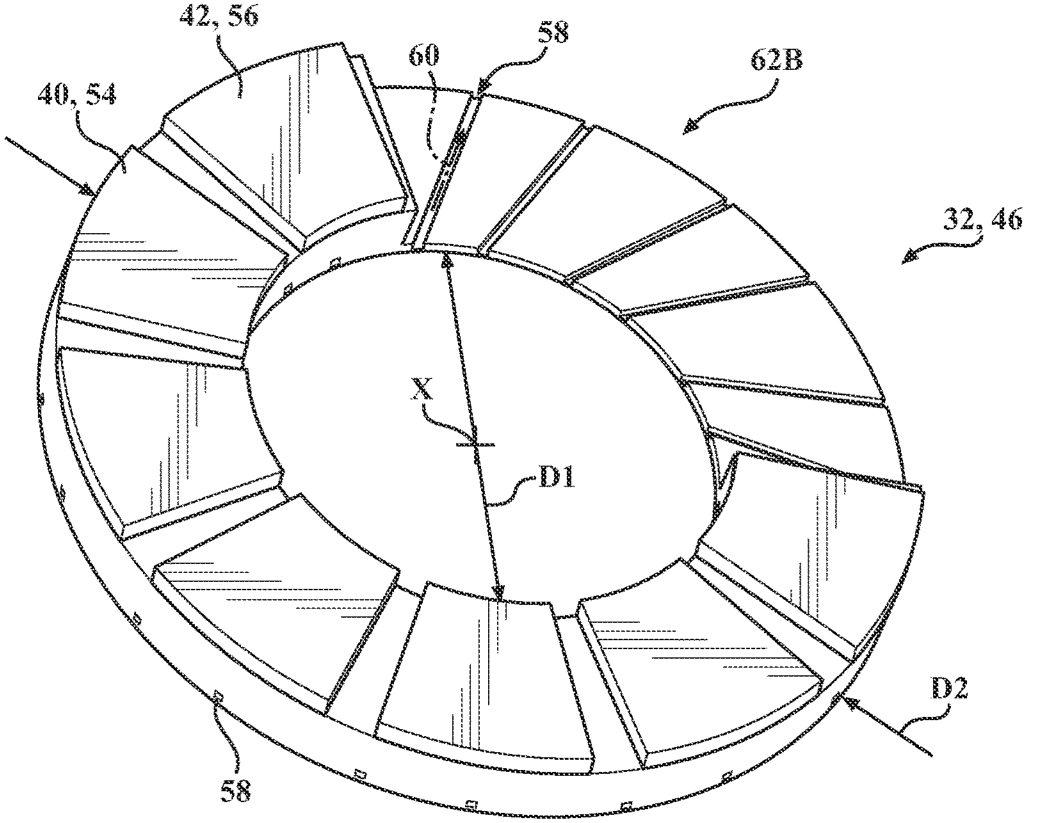
FIG. 5 is a schematic perspective view of one of the rotors shown in FIG. 2, illustrating another embodiment of plurality of coolant channels extending radially outwardly across the rotor, according to the disclosure.

As shown in FIGS. 3-6, the motor-generator 14 also has a plurality of channels 58 extending radially outwardly, from an inside diameter D1 to the outside diameter D2, across the first rotor 32. Although the coolant channels 58 are described primarily with respect to the first rotor 32, nothing precludes various embodiments of analogous channels and related features disclosed below from being similarly incorporated into the second rotor 46. When the motor-generator 14 is operating, the channels 58 are configured to direct a coolant 60, via centrifugal force, from the inside diameter D1 toward the outside diameter D2, as the first rotor 32 (and the second rotor) rotates about the rotational axis X. As shown in FIG. 3, at least one of the channels 58 may extend on the rotor first exterior surface 32-1 across each of the PMs 40, 42. As shown in FIG. 4, at least one of the plurality of channels 58 may extend on the rotor first exterior surface 32-1 between one of the PMs 40, 42 and one of the saliencies 38. As shown in FIG. 5, at least one of the plurality of channels 58 may extend across the ferromagnetic rotor core 36 on the rotor second exterior surface 32-2, or inside the rotor core.

Figure 6:
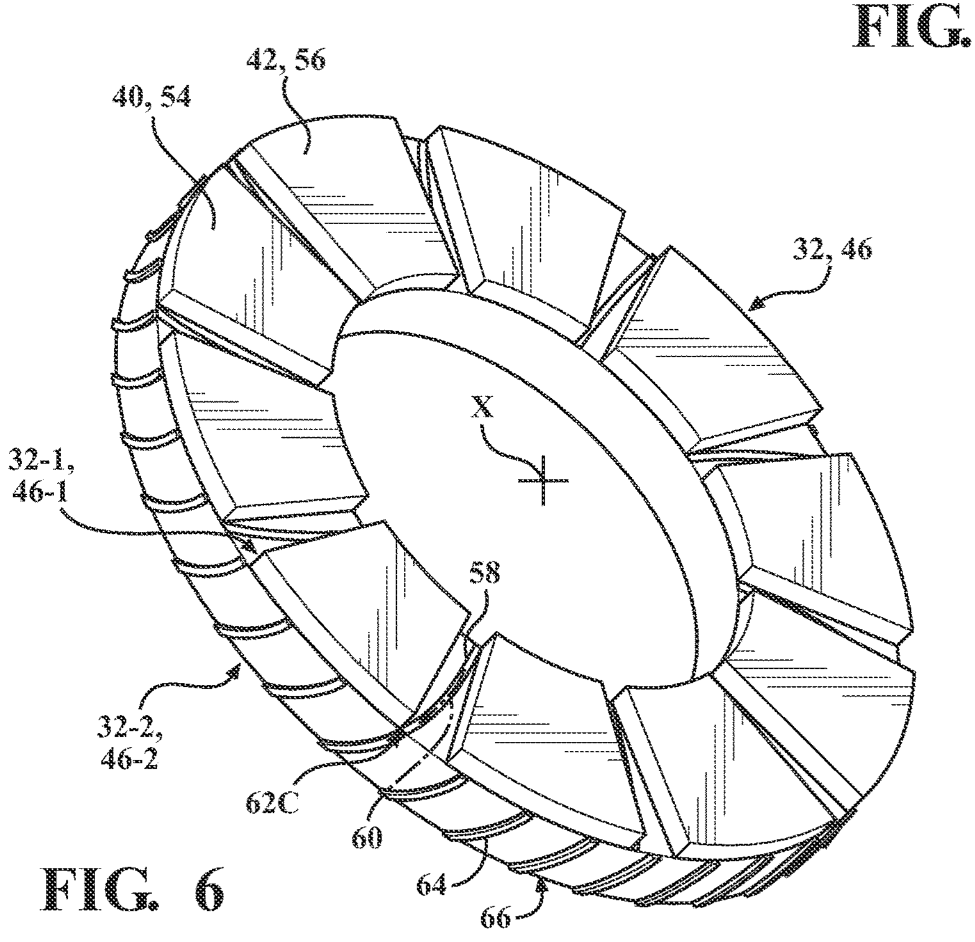
FIG. 6 is a schematic perspective view of one of the rotors shown in FIG. 2, illustrating another embodiment of plurality of coolant channels extending radially outwardly across the rotor and fan blade shape projections on the rotor outside diameter, according to the disclosure.

As shown in FIGS. 3-6, the plurality of channels 58 may define a radially disposed channel pattern. The channel pattern may be either a straight pattern 62A (shown in FIGS. 3 and 4), an inclined pattern 62B (shown in FIG. 5), or a spiral pattern 62C (shown in FIG. 6) relative to the rotational axis X. As shown in FIG. 6, the motor-generator 14 may also have a plurality of projections 64 arranged on the outside diameter D2 between the first and second rotor exterior surfaces 32-1, 32-2. Each of the projections 64 may have a curved fan blade shape 66 configured to shed the coolant 60 from the outside diameter D2 of the first rotor 32. The path and direction of the curved fan blade shape 66 may be selected to facilitate or accelerate separation of the coolant 60 from the outside diameter D2 of the spinning rotor 32 after the coolant has passed through the passages 58. As shown in FIGS. 3-6, each of the embodiments of the coolant channels 58 may be employed in the second rotor 46 as well as in the first rotor 32.

With resumed reference to FIG. 2, the motor-generator 14 also includes a rotor shaft 68 rotationally fixed to the first and second rotors 32, 46. The rotor shaft 68 is mounted rotationally inside the stator 30 coaxially with the rotational axis X. The rotor shaft 68 defines a fluid feed passage 70 and one or more cross passages 72 in fluid communication with the fluid feed passage configured to supply the coolant 60 to the plurality of channels 58 in the first and second rotors 32, 46. As shown, the motor-generator 14 additionally includes a housing 74 defining a fluid sump 76. The fluid sump 76 is configured to collect the coolant 60 after the coolant has passed through the plurality of channels 58 and was returned by the housing 74 to the fluid sump via gravity. Each of the fluid sump 76 and the fluid feed passage 70 may be in fluid communication with a fluid pump 78 configured to circulate the coolant 60, i.e., supply the coolant 60 from the fluid sump 76 to the fluid feed passage in the rotor shaft 68. The fluid pump 78 may be part of an electric motor cooling system 79 (shown in FIG. 2) operated via the electronic controller 26.

Figure 7:
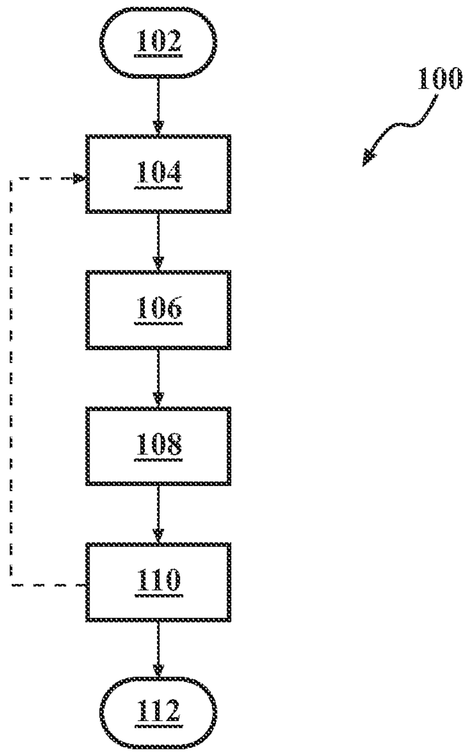
FIG. 7 is a flow diagram of a method of cooling the axial flux electric motor shown in FIGS. 1-6.

FIG. 7 depicts a method 100 of cooling an axial flux electric motor, such as the motor-generator 14, as described above with respect to FIGS. 1-6. The method 100 may be embodied in an algorithm 80 programmed into the electronic controller 26 to operate the electric motor cooling system 79. The method 100 commences in frame 102 with continuously monitoring, via the electronic controller 26, operation of the axial flux electric motor 14. After frame 102, the method proceeds to frame 104. In frame 104, the method includes obtaining, such as detecting or determining, via the electronic controller 26 in communication with corresponding sensors (not shown), data 82 indicative of an operating point 84 of the axial flux electric motor 14. The obtained data 82 includes detected or determined variables such as motor phase current, motor rotational speed, temperature of the PMs 40, 42, 54, 56, and a flow rate of the coolant 60 in the axial flux electric motor 14. The PM temperature may be either detected, otherwise determined, or estimated using recent history of other sensor readings, including that of coolant temperature.

Following frame 104, the method proceeds to frame 106. In frame 106, the method includes identifying, via the electronic controller 26, an operating point 84 on an operation map 86 of the axial flux electric motor 14 programmed into the electronic controller. After frame 106, the method advances to frame 108. In frame 108, the method includes comparing, via the electronic controller 26, the obtained or determined temperature to a predicted or maximum desired temperature 88 corresponding to the operating point 84 and programmed into the electronic controller 26. In frame 108, the method may further include assessing, via the electronic controller 26, whether the axial flux electric motor 14 is operating at a high PM loss operating point 90, i.e., a high electric motor torque or high-speed condition, corresponding to the accessed operation map 86.

Following frame 108, the method advances to frame 110. In frame 110, the method includes commanding, via the electronic controller 26, a predetermined coolant flow rate 92 through the plurality of channels 58 when the detected temperature is greater than the predicted temperature 88 to cool the axial flux electric motor 14. Additionally, in frame 110, the predetermined coolant flow rate 92 may be commanded when the axial flux electric motor 14 has been determined as operating at the high PM loss operating point 90. In frame 110, the method may further include operating, via the electronic controller 26, the fluid pump 78 to supply the coolant 60 from the fluid sump 76 to the fluid feed passage 70 in the rotor shaft 68.

Following frame 110, the method may loop back to frame 104 when the detected temperature has been reduced to or below the predicted temperature 88. Alternatively, the method may conclude in frame 112 when operation of the axial flux electric motor has been terminated. Overall, the method 100 is intended to provide effective cooling of an axial flux electric motor during extended high speed or high load operation. The method may be specifically applied to the motor-generator 14 structure described with respect to FIGS. 1-6, such as incorporating the plurality of radial channels 58, for example, fed with coolant through the fluid feed passage 70 in the rotor shaft 68. The method may therefore remove thermal stress and, among multiple benefits, provide longer motor life under higher speeds or close to peak load.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings, or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A cooled axial flux electric motor comprising:

a rotationally-fixed stator defining a rotational axis and having a plurality of conductive stator magnetic poles arranged radially about the rotational axis;

a rotor spaced axially from one side from the stator and rotatably mounted coaxially with the rotational axis, defined by an inside diameter and an outside diameter, and having a rotor first exterior surface facing the stator and a rotor second exterior surface arranged opposite the rotor first exterior surface, wherein the rotor includes:

a ferromagnetic rotor core defining the rotor second exterior surface and a plurality of alternating south and north pole permanent magnets (PMs) arranged on the ferromagnetic rotor core symmetrically around the rotational axis and facing the stator; and a plurality of channels extending radially outwardly across the rotor and configured to direct a coolant, via centrifugal force, from the inside diameter toward the outside diameter as the rotor rotates about the rotational axis; and wherein:

the ferromagnetic rotor core includes a plurality of core saliencies extending to the rotor first exterior surface;

each pair of alternating south and north pole PMs of the rotor includes one of the core saliencies arranged therebetween; and at least one of the plurality of channels extends on the rotor first exterior surface between one of the PMs and one of the saliencies.

2. The cooled axial flux electric motor according to claim 1, wherein at least one of the plurality of channels extends on the rotor first exterior surface across each of the PMs.

3. The cooled axial flux electric motor according to claim 1, wherein at least one of the plurality of channels extends on the rotor second exterior surface.

4. The cooled axial flux electric motor according to claim 1, wherein the plurality of channels defines a radially disposed channel pattern, and wherein the channel pattern is one of a straight, inclined, and spiral relative to the rotational axis.

5. The cooled axial flux electric motor according to claim 1, further comprising a plurality of projections arranged on the outside diameter between the first and second rotor exterior surfaces.

6. The cooled axial flux electric motor according to claim 5, wherein each of the projections has a curved fan blade shape configured to shed the coolant from the outside diameter of the rotor.

7. The cooled axial flux electric motor according to claim 1, further comprising a rotor shaft fixed to the rotor and mounted rotationally inside the stator coaxially with the rotational axis, wherein the rotor shaft defines a fluid passage configured to supply the coolant to the plurality of channels.

8. The cooled axial flux electric motor according to claim 7, further comprising a housing defining a fluid sump configured to collect the coolant after the coolant has passed through the plurality of channels and return the coolant to the fluid sump via gravity.

9. The cooled axial flux electric motor according to claim 8, wherein each of the fluid sump and the fluid passage in the rotor shaft is in fluid communication with a fluid pump configured to supply the coolant from the fluid sump to the fluid passage in the rotor shaft.

10. The cooled axial flux electric motor according to claim 1, wherein at least one of the plurality of channels extends across the ferromagnetic rotor core on the rotor second exterior surface or inside the ferromagnetic rotor core.

11. A method of cooling an axial flux electric motor, the method comprising:

obtaining, via an electronic controller, data indicative of an operating point of the axial flux electric motor, wherein the axial flux electric motor includes:

a rotationally-fixed stator defining a rotational axis and having a plurality of conductive stator magnetic poles arranged radially about the rotational axis;

a rotor spaced axially from one side from the stator and rotatably mounted coaxially with the rotational axis, defined by an inside diameter and an outside diameter, and having a rotor first exterior surface facing the stator and a rotor second exterior surface arranged opposite the rotor first exterior surface, wherein:

the rotor includes a ferromagnetic rotor core defining the rotor second exterior surface and a plurality of alternating south and north pole permanent magnets (PMs) arranged on the ferromagnetic rotor core symmetrically around the rotational axis and facing the stator;

the ferromagnetic rotor core includes a plurality of core saliencies extending to the rotor first exterior surface;

each pair of alternating south and north pole PMs of the rotor includes one of the core saliencies arranged therebetween;

at least one of the plurality of channels extends on the rotor first exterior surface between one of the PMs and one of the saliencies;

a plurality of channels extending radially outwardly across the rotor and configured to direct a coolant, via centrifugal force, from the inside diameter toward the outside diameter as the rotor rotates about the rotational axis; and the obtained data includes a phase current, rotational speed, temperature, and a flow rate of the coolant in the axial flux electric motor;

identifying, via the electronic controller, the operating point on an operation map of the axial flux electric motor;

comparing, via the electronic controller, the obtained temperature to a predicted temperature corresponding to the operating point; and commanding, via the electronic controller, a predetermined coolant flow rate through the plurality of channels when the obtained temperature is greater than the predicted temperature to cool the axial flux electric motor.

12. The method according to claim 11, further comprising assessing, via the electronic controller, whether the axial flux electric motor is operating at a high PM loss operating point corresponding to the operation map, wherein commanding the predetermined coolant flow rate through the plurality of channels when the axial flux electric motor is operating at the high PM loss operating point.

13. The method according to claim 11, wherein the axial flux electric motor additionally includes:

a rotor shaft fixed to the rotor, mounted rotationally inside the stator coaxially with the rotational axis, and defines a fluid passage configured to supply the coolant to the plurality of channels; and a housing defining a fluid sump configured to collect the coolant after the coolant has passed through the plurality of channels and return the coolant to the fluid sump via gravity;

the method further comprising operating, via the electronic controller, a fluid pump to supply the coolant from the fluid sump to the fluid passage in the rotor shaft.

14. The method according to claim 11, wherein:

the rotor includes a ferromagnetic rotor core and a plurality of alternating south and north pole permanent magnets (PMs) arranged on the rotor first exterior surface symmetrically around the rotational axis; and at least one of the plurality of channels extends on the rotor first exterior surface across each of the PMs.

15. The method according to claim 11, wherein at least one of the plurality of channels extends on the rotor second exterior surface.

16. The method according to claim 11, wherein the plurality of channels defines a radially disposed channel pattern, and wherein the channel pattern is one of a straight, inclined, and spiral relative to the rotational axis.

17. The method according to claim 11, further comprising a plurality of projections arranged on the outside diameter between the first and second rotor exterior surfaces.

18. The method according to claim 17, wherein each of the projections has a curved fan blade shape configured to shed the coolant from the outside diameter of the rotor.

19. The method according to claim 11, wherein at least one of the plurality of channels extends across the ferromagnetic rotor core on the rotor second exterior surface or inside the ferromagnetic rotor core.

20. A cooled axial flux electric motor comprising:

a rotationally-fixed stator defining a rotational axis and having a plurality of conductive stator magnetic poles arranged radially about the rotational axis;

a rotor spaced axially from one side of the stator and rotatably mounted coaxially with the rotational axis, defined by an inside diameter and an outside diameter, and having a rotor first exterior surface facing the stator and a rotor second exterior surface arranged opposite the rotor first exterior surface, wherein the rotor includes:

a ferromagnetic rotor core defining the rotor second exterior surface and a plurality of alternating south and north pole permanent magnets (PMs) arranged on the ferromagnetic rotor core symmetrically around the rotational axis and facing the stator; and a plurality of channels extending radially outwardly across the rotor and configured to direct a coolant, via centrifugal force, from the inside diameter toward the outside diameter as the rotor rotates about the rotational axis; and wherein:

the ferromagnetic rotor core includes a plurality of core saliencies extending to the rotor first exterior surface;

each pair of alternating south and north pole PMs of the rotor includes one of the core saliencies arranged therebetween; and at least one of the plurality of channels extends on the rotor first exterior surface between one of the PMs and one of the saliencies;

a rotor shaft fixed to the rotor and mounted rotationally inside the stator coaxially with the rotational axis, wherein the rotor shaft defines a fluid passage configured to supply the coolant to the plurality of channels; and a housing defining a fluid sump configured to collect the coolant after the coolant has passed through the plurality of channels and return the coolant to the fluid sump via gravity.

* * * * *